July 26, 1966  R. Q. JAMESON  3,262,640
VARIABLE COURSE APPROACH COMPUTER
Filed Oct. 12, 1964  2 Sheets-Sheet 1

INVENTOR.
Robert Q. Jameson,
BY
H. H. Losche
Paul S. Collignon Att'ys.

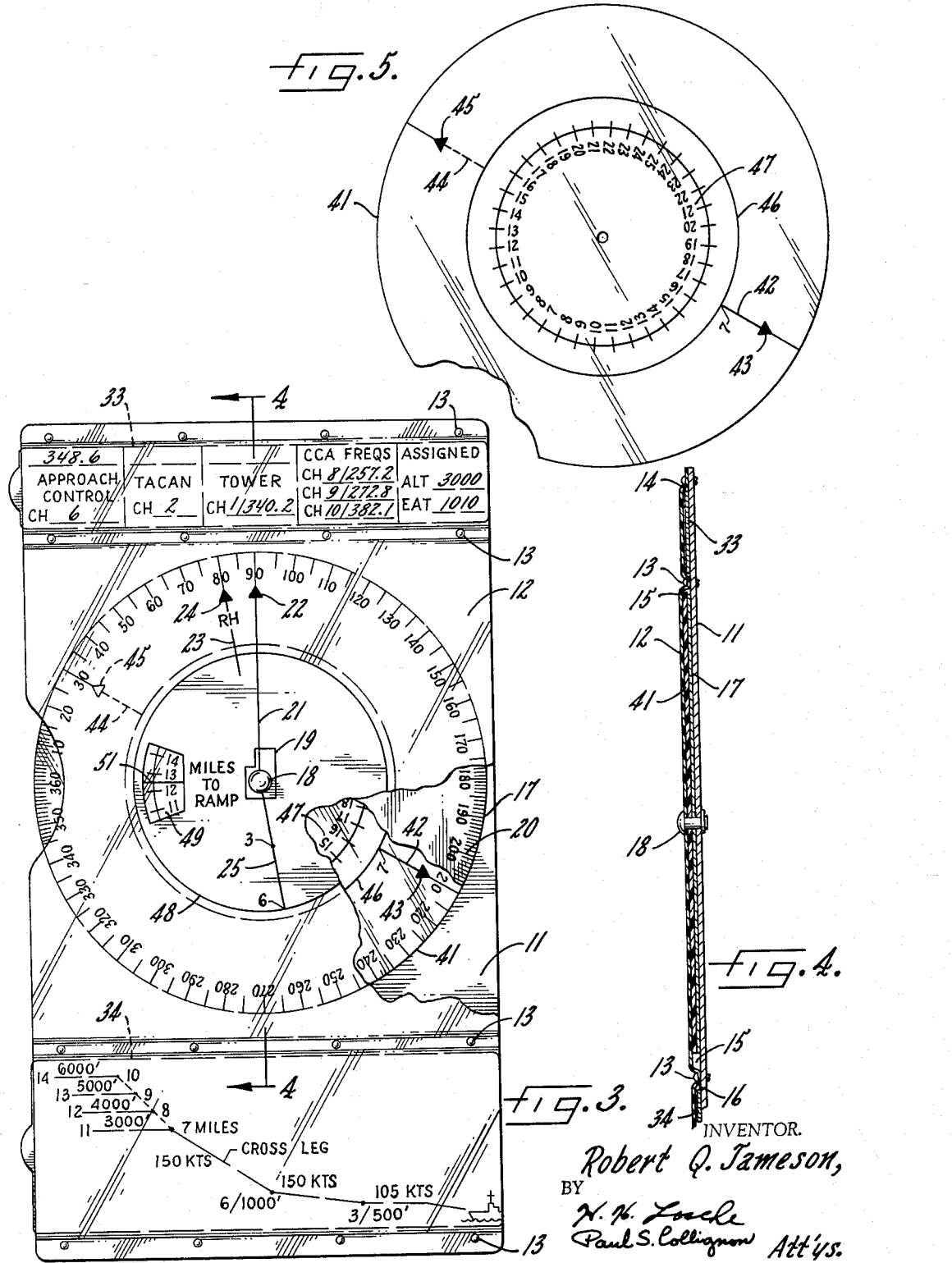

United States Patent Office 3,262,640
Patented July 26, 1966

3,262,640
VARIABLE COURSE APPROACH COMPUTER
Robert Q. Jameson, 3446 Meadow Road, Hapeville, Ga.
Filed Oct. 12, 1964, Ser. No. 403,415
5 Claims. (Cl. 235—78)

The invention described herein may be manufactured and used by or for the Government of the United States of America for governmental purposes without the payment of any royalties thereon or therefor.

The present invention relates to a hand manipulated computer for use by a pilot of an aircraft in making a landing, and more particularly, to a computer for use in making a landing aboard an aircraft carrier which can have its runway heading in any desired direction.

Various types of hand manipulated computers are available for providing data needed by aircraft pilots when entering an airport zone for a landing, such as, a visual relationship of the plane's heading with the heading of the runway on which the pilot is instructed to land. Heretofore, however, the available computers have been designed for use at airports where the runways are fixed and these computers are not adaptable for landings aboard aircraft carriers wherein the runway may be pointing in any desired direction.

The present invention provides a hand manipulated computer which will solve the pilot's problem of computing the various headings of an aircraft approach in making a landing on an aircraft carrier. A transparent front plate is attached to an opaque back plate with a third plate being rotatably mounted between the two plates. The third plate is marked off in 360 degrees. The transparent front plate is imprinted with a first line and arrowhead representing the direction of travel of the aircraft carrier and a second line and arrowhead is provided which depicts the direction of the runway heading. Also depicted is a solid line that indicates the outbound course of a holding radial and a broken line indicates the inbound course. Two additional solid lines are provided, one being the cross leg course from the point of the holding radial and the other being the final approach course. The pilot need only set the compass heading of the aircraft carrier on the computer and all the other headings are provided.

It is therefore a general object of the present invention to provide a computer that will provide the necessary course headings for holding and then landing aboard an aircraft carrier.

Another object of the present invention is to provide a computer that will provide an aircraft pilot a two dimensional picture of the aircraft's position relative to the aircraft carrier's course.

Other objects and advantages of the present invention will be readily appreciated as the same becomes better understood by reference to the following detailed description when considered in connection with the accompanying drawings wherein:

FIGURE 3 is a top plan view with parts partially broken away showing a second embodiment of a variable course approach computer;

FIGURE 4 is a sectional view taken on line 4—4 of FIGURE 3; and

FIGURE 5 is a top plan view of a rotatable disk.

Figure 1:
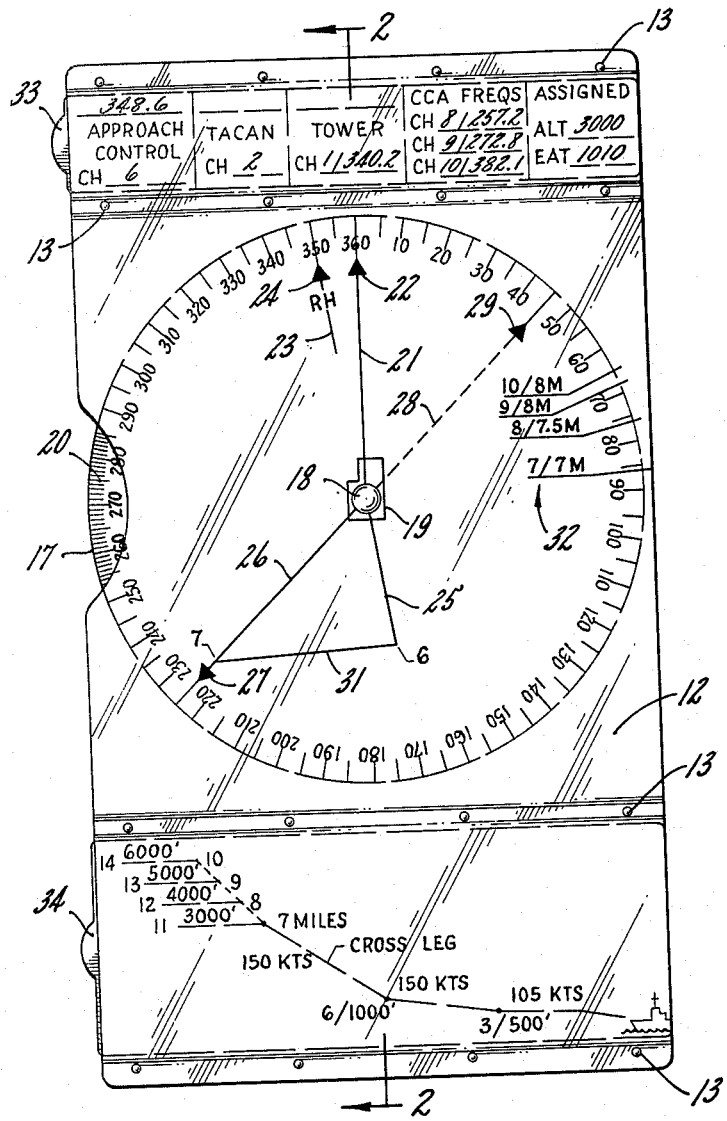
FIGURE 1 is a top plan view showing one embodiment of a variable course approach computer.
Figure 2:
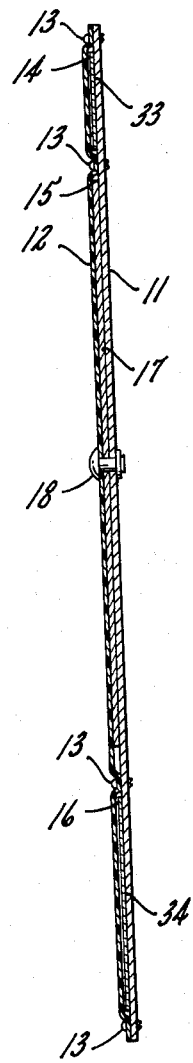
FIGURE 2 is a sectional view taken on line 2—2 of FIGURE 1.

Referring now to the drawings, wherein like reference characters designate like or corresponding parts throughout the several views, there is shown in FIGURES 1 and 2 a preferred embodiment of a variable course approach computer. A relatively stiff back plate 11 of cardboard, plastic, metal, or the like, is provided, and a transparent front plate 12 is attached thereto at its top and bottom ends. By way of example, the front and back plates are shown held together by means of rivets 13, however, other means of fastening, such as stapling or cementing, will work equally as well. Two additional parallel rows of rivets, or staples, are provided through plates 11 and 12 that, in effect, form three compartments or pockets 14, 15, and 16.

Center pocket 15 is provided with a disk 17 that is rotatably mounted between plates 11 and 12. Any convenient device, such as a rivet 18, may be used to rotatably mount disk 17 between the two plates. Near the edge of disk 17 there is imprinted a circular scale 20 which depicts degrees of arc from 0 degrees to 360 degrees in a clockwise direction.

A block FIGURE 19 is imprinted on the center of the transparent front plate 12 and represents an aircraft carrier having a canted deck. A solid black line 21, which extends from the center of FIGURE 19 to a point coincident with the edge of disk 17, is provided with an arrowhead 22 which indicates the direction of travel of the aircraft carrier. A short line 23 having an arrowhead 24 is provided at the left side of line 21 and is marked "RH" to denote runway heading. The angle between lines 21 and 23 is determined by the angle of the deck landing area and, by way of example, might be ten degrees. Another portion of runway heading is designated by number 25 and is shown extending from a point representing 6 miles from the carrier to the carrier deck.

Another solid black line 26 having an arrowhead 27 extends from the center of FIGURE 19 to a point coincident with the edge of disk 17. Black line 26 is at an angle of 225 degrees, taken in a clockwise direction, from black line 21, and indicates the outbound course for the holding pattern. Dotted line 28, which is provided with arrowhead 29, is an extension of line 26 and indicates the inbound course for the holding pattern. A typical holding pattern consists of flying an outbound course for four miles and then turning around and flying an inbound course for four miles. This cycle is repeated until it is time to fly a cross-leg heading. A cross-leg heading line 31 extends between line 26 and line 25 and represents the path of travel from a point 7 miles from carrier on the holding radial to a point 6 miles from carrier on the final approach line.

A scale 32 is also imprinted on transparent front plate 12 and has radial marks that cross the edge of disk 17 which can be seen beneath transparent front plate 12. A separate line on scale 32 is provided for each radial holding distance and, for purposes of illustration, four distances of 7 miles, 8 miles, 9 miles, and 10 miles are shown. Also, a number followed by the letter "M" is given for each distance to indicate an approximate time, in minutes, to travel from the holding position via the cross-leg heading and final approach to the landing area.

Pocket 14 is provided with a frequency data card 33 and pocket 16 is provided with a profile view card 34 for holding and approach. Both cards are slip-fitted into their appropriate pockets and can be readily changed for various situations. For example, a different profile view card would be used for each different type of aircraft, as the landing speeds for the various aircrafts are different. The pilot records on data card 33 the information shown in script, as this information is selectively assigned to each pilot.

*Example of operation*

By way of an example of operation for the embodiment shown in FIGURE 1 of the drawings, assume that an aircraft carrier is moving in a direction of 360 degrees (north) and that the aircraft pilot has been given a holding altitude of 3000 feet and a ramp time of 1010 hours. The pilot first notes his assigned altitude and estimated arrival time (EAT) on frequency data card 33, and then aligns the 360 degree mark on disk 17 with line 21. Line 26 now indicates that the holding radial is 225 degrees for outbound and line 28 indicates 45 degrees for the inbound course, and by checking the profile view card 34, which is positioned in pocket 16, the pilot can determine that for an altitude of 3000 feet, he must travel outbound from a point 7 miles from the carrier to a point 11 miles from the carrier, and then turn around to travel inbound to the 7 mile point. By referring to scale 32, the pilot can determine, that for the 7 mile point, he must travel in a direction of 86 degrees in order to intercept the 6 mile point on the runway heading of 350 degrees, which is designated by number 25. Scale 32 also indicates that 7 minutes are required to travel from the 7 mile holding point to the landing area, and as an assumed ramp time of 1010 hours was given, the pilot must depart from the 7 mile holding point at approximately 1003 hours. By referring to the profile view card 34, the pilot sees that while traveling the cross-leg 31 he must descend from an altitude of 3000 feet to an altitude of 1000 feet and that while traveling on the runway heading of 350 degrees, he must descend from an altitude of 1000 feet at 6 miles out to an altitude of 500 feet at 3 miles out. It should be noted that the computer has been prefigured for a 30 knot relative wind.

Assuming now that the pilot had been assigned a holding altitude of 5000 feet instead of 3000 feet, the profile view card 34 indicates that the holding pattern will be between 9 miles and 13 miles. The pilot will fly an outbound course at an altitude of 5000 feet for a distance of four miles to a point 13 miles out and then turn around and fly inbound for a distance of four miles to a point 9 miles out. Scale 32 indicates that from the 9 mile point, the pilot will fly a cross-leg heading of approximately 68 degrees and will intercept the 6 mile point in about 8 minutes.

Referring now to FIGURES 3 and 4 of the drawings, a second embodiment of the invention is shown that provides for a variable holding radial in relation to the ship's heading. A second disk 41 is interposed between front plate 12 and disk 17 and is rotatably mounted by the same means, such as rivet 18, that mounts disk 17. Disk 41 is made of a transparent material, such as clear plastic, and has a solid black line 42 with arrowhead 43 thereon that indicates the outbound course of the holding radial. Dotted line 44, which is provided with arrowhead 45, is an extension of line 42 and indicates the inbound course for the holding pattern.

As best shown in FIGURE 5 of the drawings, a circular line 46 is imprinted on disk 41 and a circular scale 47 is imprinted inside the circular area formed by line 46. Scale 47 is graduated and numbered to represent miles and, when used in conjunction with lines 21 and 42, represents miles from the 7 mile holding radial, which coincides with line 46, to the landing area.

As shown in FIGURE 3 of the drawings, a circular opaque area 48 is provided on front plate 12, and the diameter of area 48 represents a distance of 6 miles from the landing area. A window, or opened area, 49 is provided in opaque area 48 and a portion of scale 47 can be viewed through this open area. A thin line 51 is provided to serve as a pointer.

*Example of operation*

By way of an example of operation for the embodiment shown in FIGURES 3 and 4 of the drawings, assume that an aircraft carrier is moving in a direction of 90 degrees (East) and that the aircraft pilot has been given a holding radial of 210 degrees and assigned an altitude of 3000 feet. First, the pilot sets the ship's course on rotating disk 17 so that the 90 degree mark will coincide with line 21 on front plate 12. Next, the holding radial is set by rotating disk 41 relative to disk 17 so that line 42 is at the 210 degree mark. Line 44 indicates that the inbound radial course is 30 degrees. The pilot will fly an outbound course heading of 210 degrees for four miles and then turn around and fly inbound at 30 degrees for four miles. The cycle is repeated until time to fly the cross-leg heading, which is started from the seven mile holding circle. By referring to scale 47 which shows through window 49, the aircraft pilot can readily determine that the distance from the 7 mile holding circle, via the cross-leg, and runway heading, is approximately 12.5 miles. As the pilot starts his final runway approach at the 6 mile circle, the pilot can readily mentally calculate the distance of the cross-leg is approximately 6.5 miles. In the event that it becomes necessary for the ship to change its course, both disks 17 and 41 should be rotated together to set the new ship's heading and the assigned holding radial will be unchanged.

It is apparent from the foregoing description that there is provided a new and novel computer which will assist an aircraft pilot in making a carrier landing. The computer is simple to operate and reduces the possibility of making errors to a minimum. The device is quite simple and inexpensive in construction and yet is quite accurate, efficient, and reliable in operation.

Obviously many modifications and variations of the present invention are possible in the light of the above teachings. It is therefore to be understood that within the scope of the appended claims, the invention may be practiced otherwise than as specifically described.

What is claimed is:

1. An approach computer for use by pilots in making a carrier landing comprising:
    a back plate,
    a transparent front plate attached to said back plate at the top and bottom edges thereof and at two intermediate positions thereby forming a center pocket and first and second end pockets for removably holding data cards,
    first and second data cards slidably mounted one each in each said end pocket,
    a first circular disk rotatably mounted in said center pocket, said disk having a first scale adjacent the outer edge thereof of equal divisions representing compass heading marks from 0 to 360 degrees,
    first and second index marks of said transparent front plate adaptable to be aligned with said compass heading marks, said first index mark indicating direction of travel of a carrier and said second index mark indicating runway heading of the canted runway on said carrier,
    a third index mark adaptable to be aligned with said compass heading marks for indicating an assigned holding position prior to making a landing, and
    a second scale indicating the approximate distance of travel from said holding position to said canted runway by first traveling in a cross-leg direction from said holding position to a point on said runway heading and then traveling from said point to said canted runway.

2. An approach computer for use by pilots in making a carrier landing as set forth in claim 1 wherein said third index mark is imprined on said front plate.

3. An approach computer for use by pilots in making a carrier landing as set forth in claim 2 wherein said second scale is imprinted on said transparent front plate.

4. An approach computer for use by pilots in making a carrier landing as set forth in claim 1 wherein said third index mark and said second scale are imprinted on a second circular disk, said second circular disk being of transparent material and being interposed between said first circular disk and said transparent front plate.

5. An approach computer for use by pilots in making a carrier landing comprising:
- a rectangular-shaped back plate,
- a rectangular-shaped transparent front plate attached to said back plate at the top and bottom edges thereof and at two intermediate positions thereby forming a center pocket and first and second end pockets for removably holding data cards,
- first and second data cards slidably mounted one each in each said end pocket,
- first and second circular disks rotatably mounted concentrically within said center pocket, said first circular disk having a scale adjacent the outer edge thereof of equal divisions representing compass headings from 0 to 360 degrees, said second circular disk being of transparent material and positioned between said first circular disk and said transparent front plate and having a scale of thirty-six marks spaced at 10 degree intervals from one another and numbered from 7 to 25 to 7, and an index marker on said second disk adjacent the outer edge thereof and adapted to be aligned with the compass headings on said scale of said first circular disk, and first, second, and third index marks on said transparent front plate, said first and second marks being adapted to be aligned with the compass headings on said scale of said first circular disk, and said third index mark being adapted to be aligned with said marks on said second circular disk.

References Cited by the Examiner

UNITED STATES PATENTS

| | | | |
|---|---|---|---|
| 1,526,399 | 2/1925 | Turniquist | 40—70 |
| 2,105,103 | 1/1938 | Sinitzin-White | 235—61 X |
| 2,423,764 | 7/1947 | Flitton | 235—78 |
| 2,425,097 | 8/1947 | Isom | 235—84 X |
| 2,508,894 | 5/1950 | Schloer | 40—70 |
| 2,996,242 | 8/1961 | Bannister | 235—78 X |
| 3,093,905 | 6/1963 | Zaher | 235—61 X |
| 3,100,601 | 8/1963 | Shapiro | 235—78 X |

LOUIS J. CAPOZI, *Primary Examiner.*

LEO SMILOW, T. J. ANDERSON, *Assistant Examiners.*